Figure 1:
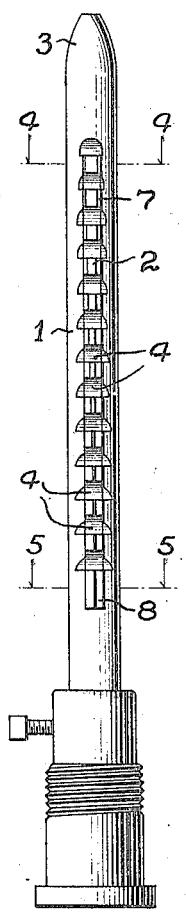

Jan. 23, 1923.

E. W. TAYLOR.
CUTTING TOOL.
FILED JUNE 19, 1918.

1,443,058

Edward W. Taylor, Inventor
By his Attorneys

Patented Jan. 23, 1923.

1,443,058

UNITED STATES PATENT OFFICE.

EDWARD W. TAYLOR, OF SALT LAKE CITY, UTAH.

CUTTING TOOL.

Application filed June 19, 1918. Serial No. 240,718.

*To all whom it may concern:*

Be it known that I, EDWARD W. TAYLOR, a citizen of the United States, and a resident of Salt Lake City, county of Salt Lake, and State of Utah, have invented an Improvement in Cutting Tools, of which the following is a specification.

My invention relates to a cutting tool adapted to form, in one operation, a channel of desired dimensions, and has particular reference to the forming of an interior channel in a screw threaded member, such as a nut, a threaded hole, a threaded collar, a threaded sleeve, or other classes of threaded members; also to unthreaded members or their holders, where a keying effect is desired, to receive a locking pin as in the manner described in my reissued Letters Patent No. 13,986 of September 21, 1915, and as disclosed by my basic Patent No. 974,842, dated November 8th, 1910, whereby associated members were keyed together by the use of only one key-way and a locking pin.

In the commercial practice of the invention of my said reissued Letters Patent, I prefer to perform the operation of cutting the channel upon a finished nut or bolt, and associated threaded and unthreaded members, since I am enabled to use stock nuts and bolts, and associated threaded and unthreaded members, and the usual order of manufacture of the bolts or nuts and associated threaded and unthreaded members, by automatic machinery or otherwise, is not interfered with.

It is therefore necessary to produce a tool which, while arranged to form a groove in the screw member transversely to the screw threads, or in line with its axis, will not damage the threads or surfaces so as to require re-threading or repairing before use.

In such a device, it is also necessary to provide guiding means so that the groove will be of the proper depth and contour and to provide cutting edges capable of being worked at relatively high speeds. It is also desirable to produce a device in which the cutting member may be readily sharpened and may be adjusted to compensate for any material removed in the process of sharpening.

Figure 2:
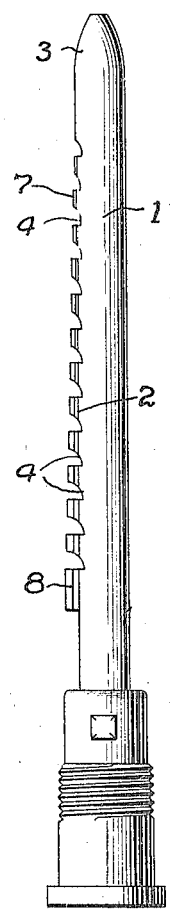
Figure 3:
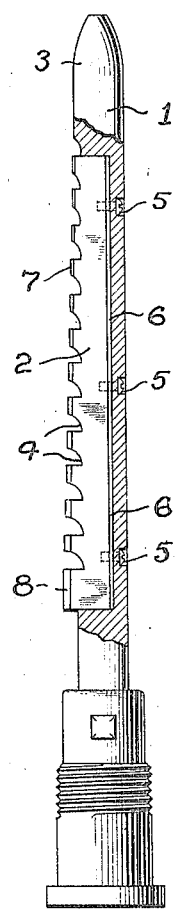
Figure 4:
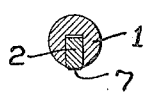
Figure 5:
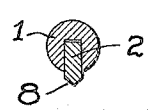

In the drawings, I have shown,

In Fig. 1, a front view of my improved tool;

In Fig. 2, a side view thereof;

In Fig. 3, a side view thereof, partly in section;

In Fig. 4, a section taken on the line 4—4 of Fig. 1;

In Fig. 5, a section taken on the line 5—5 of Fig. 1; and

Figure 6:
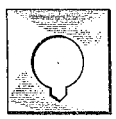
Figure 7:
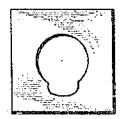

In Figs. 6 and 7, nuts which have been grooved by the application of my improved tool.

In the embodiment shown in the drawings, to which my invention is in no way limited, since it will be obvious that the tool may be utilized to cut a groove externally as well as internally, the tool comprises a holding and guiding member 1 and a cutting member 2. The holding and guiding member 1 is tapered, as at 3, to provide easy ingress into the hole of a nut or other object, threaded or unthreaded, but is otherwise of substantially the diameter of said hole, so as to produce a close but loose or working fit.

The holding and guiding member 1 is provided with a longitudinal recess of substantially the width and length of the cutting member 2, and is preferably formed with notches 4 at the edges of the recess to correspond with the indentations between the teeth of the cutting member, as will be hereinafter pointed out. The holding and guiding member is preferably of a ductile material, such as a soft or cold-rolled steel that may or may not be case hardened. Such material is particularly desirable in this connection on account of its heat-conducting and heat-absorbing qualities under conditions of rapid and constant friction. It is also adapted to withstand flexing and crystallization and to form a substantial massive support for the cutting member 2.

Cutting member 2, which is preferably made of a hard material, such as tungsten steel, fits within the recess in the guiding and holding member 1, and is adjustably and removably held in the recess by means of screws 5, which pass through holes in the holding and guiding member into the cutting member, or otherwise. To adjust the cutting member toward and away from its work, shims 6 are introduced between the bottom of the recess and the cutting member, or removed therefrom, as the occasion may require.

Cutting member 2 is provided with a plurality of steps or teeth 7 of progressively increasing dimensions, the smallest being located adjacent the tapered end of the guiding and holding member. Said teeth 7 are shaped so as to more and more closely approximate the finished contour of the slot to be cut, as they recede from the tapered point of the guiding and holding member 1. Thus, teeth 7 become higher and their angular sides become wider and approach one another more and more the farther the teeth are removed from the tapered point. It will be understood that the embodiment of my invention shown in Figs. 1, 2 and 3 is that adapted to cut the form of groove shown in Fig. 6. Each of the cutting teeth 7 is slightly higher at the cutting edge which in each case is the edge nearest the tapered point and a deep indentation is cut between the teeth in advance of the cutting edge of each tooth to provide a recess for accommodating cut-off material in the form of chips or shavings of metal, the openings of said recesses being arranged so as to effectively clear the teeth of accumulated shavings. The last tooth 8 conforms exactly to the shape of the groove desired to be cut, and is of considerably greater length than the other teeth of the cutting member. In fact, I prefer to make the tooth 8 equal in length to, or slightly longer than the thickness of the nut and hole operated upon. This affords a straight bearing surface for the nut and hole from which it may be easily removed without danger of cramping the cutting edge.

Fig. 7 shows an alternative form of groove which the tool shown in Figs. 1, 2 and 3 may be arranged to cut. In cutting the groove of Fig. 7, the same principle is pursued, but the sides of the teeth, instead of being angular, would be slightly rounded.

It will be understood that the form of tool shown in the drawings is not the only form the tool may take, but that it is illustrative merely of an embodiment of my invention which I have found to give good results in practice.

It will also be understood that the use of this tool is not limited to special machinery or special construction, as it can be employed in any manner desired to produce a groove, slot and key-way.

What I claim is:

1. A cutting tool comprising a cutting element having a plurality of cutting edges of progressively varying dimensions and clearance recesses alternating with said cutting edges, and a cutting element holder provided with a longitudinal slot to receive said element and with transverse slots positioned to register with portions of the clearance recesses in the cutter.

2. A cutting tool comprising a cutting element and a holder having a longitudinal slot to receive said element and a transverse slot communicating with one end of said longitudinal slot and adjacent to a cutting edge of said cutting element.

3. In a device of the class described, in combination, a cutting element having alternating cutting teeth and clearance recesses arranged longitudinally of said element, said cutting teeth and clearance recesses varying progressively in at least one of their dimensions, and a holder having a longitudinally extending recess for receiving said element and having slots extending transversely of said recess adapted to form lateral continuations of said clearance recesses in said cutting element.

4. A cutting tool comprising a cutting element having alternate cutting teeth and clearance recesses, said cutting teeth varying progressively in at least one of their dimensions to cause said teeth to remove a progressively increasing amount of material, and a holder for said element having transverse slots of progressively varying dimensions communicating with the clearance recesses to accommodate said progressively increasing amount of material cut by said teeth.

5. A cutting tool comprising a cutting element having cutting teeth of progressively varying dimensions, a holder having a longitudinal slot to receive said element, and a shim adapted to be received in said longitudinal slot for adjusting the height of the cutting teeth.

6. A cutting tool for cutting interiorly-disposed slots in nuts or the like, comprising a holder of relatively soft steel case-hardened having a tapered portion for entering into the nut and an extended portion of substantially uniform cross section adapted to engage the unslotted interior portions of said nut, and a cutter of relatively hard steel mounted in the said portion of substantially uniform cross section of said holder, said cutter having cutting teeth of successively varying dimensions.

7. A cutting tool for cutting interiorly-disposed slots in nuts or the like, comprising a cutting element having cutting teeth of progressively varying dimensions, and a recessed holder for receiving said element while permitting said teeth to project radially therefrom and having an extended portion of substantially uniform cross section adapted to engage the unslotted interior portions of said nut, thereby to prevent relative displacement between said teeth and said nut in a radial direction, the last and largest cutting tooth of said element being extended longitudinally to a greater length than a preceding tooth thereby to prevent relative rotational movement between said nut and said cutting teeth preparatory to the withdrawal of the latter from the former.

In testimony whereof, I have signed my name to this specification this 10th day of June, 1918.

EDWARD W. TAYLOR.